United States Patent [19]

Walker

[11] 4,230,587
[45] Oct. 28, 1980

[54] ADDITIVE COMPOSITION FOR RELEASE OF STUCK DRILL PIPE

[75] Inventor: Clarence O. Walker, Richmond, Tex.

[73] Assignee: Texaco Inc., White Plains, N.Y.

[21] Appl. No.: 974,185

[22] Filed: Dec. 26, 1978

[51] Int. Cl.² .............................................. E21B 23/00
[52] U.S. Cl. .............................. 252/8.55 R; 166/301; 252/8.55 B
[58] Field of Search .......... 252/8.55 B, 8.5 C, 8.55 R; 166/301

[56] References Cited

U.S. PATENT DOCUMENTS

| | | | |
|---|---|---|---|
| 2,589,949 | 3/1952 | Meadors | 252/8.5 |
| 3,217,802 | 11/1965 | Reddie et al. | 252/8.55 X |
| 3,223,622 | 12/1965 | Lummus et al. | 252/8.5 |

OTHER PUBLICATIONS

Carbowax Polyethylene Glycols, Booklet by Union Carbide Chemicals Co., New York, 1960, pp. 3-6 and 11.

*Primary Examiner*—Herbert B. Guynn
*Attorney, Agent, or Firm*—Carl G. Ries; Robert A. Kulason; James F. Young

[57] ABSTRACT

An additive composition effective in the release of stuck pipe in a bore hole during a drilling operation.

10 Claims, No Drawings

ADDITIVE COMPOSITION FOR RELEASE OF STUCK DRILL PIPE

BACKGROUND OF THE INVENTION

1. Field of the Invention

This invention relates to new compositions useful in drilling operations wherein the drill string is stuck in the hole and cannot be readily released.

2. Description of Prior Art

During drilling operations the drill string may become stuck and cannot be raised, lowered, or rotated. There are a number of mechanisms possible which may contribute to this problem. Namely these are (1) cuttings or slough build-up in the hole, (2) an undergage hole, (3) key-seating and (4) differential pressures.

This invention relates particularly to the differential pressure problem and is intended to be a novel approach to alleviating this situation.

Differential sticking may be defined as the sticking of the drill string against a permeable formation containing less pore fluid pressure than the hydrostatic pressure exerted by the drilling fluid column and usually occurs when the drill string remains motionless for a period of time. The mechanism by which this occurs involves the drill string coming into contact with the permeable zone, remaining quiescent for a period of time sufficient for mud cake to build-up on each side of the point of contact, thus sealing the pipe against the borehole. The annular pressure exerted by the drilling fluid then holds the pipe against the borehole or the permeable zone.

Freeing of differentially stuck pipe is essentially a matter of reducing this pressure differential which exists across the pipe. One method used simply involves a reduction in fluid pressure by replacing the annular fluid with a less dense fluid allowing for less pressure differential to exist between the borehole and annulus. In some cases the borehole pressure may exceed the annular pressure which in turn allows the pipe to be blown away from the borehole.

The most commonly used method to release stuck pipe is the spotting of an oil mud in the hole opposite the stuck interval. With time, the isolated area between the drill pipe and borehole is reduced by the oil mud. Too, oil invasion into the mud cake reduces the adhesive forces and lubricates the area between the pipe and borehole resulting in less friction and quicker release. More often than not, an extensive period of time is necessary for this to occur which results in an expensive loss of rig time.

In recent years, there has been a number of proprietary formulations developed aimed at releasing differentially stuck pipe. These also seem to require a great deal of time and the success ratio is somewhat questionable.

SUMMARY OF THE INVENTION

The present invention consists in the use of a specific class of additive, namely a polyethylene glycol having a specified weight, as hereinafter more fully described, or a saturated salt water solution or a sea water solution of said glycol to effect release of the stuck drill string in the bore hole.

DETAILED DESCRIPTION

The additive of the present invention comprises a polyethylene glycol or a saturated salt water solution or a sea water solution of the polyethylene glycol. The polyethylene glycol must have a molecular weight of at least 106 up to a maximum about of 600, more or less. A polyethylene glycol having a molecular weight less than 106 such as, for example, ethylene glycol, is ineffective. Moreover, polyalkylene glycols having a molecular weight above about 600 are not desirable since the results obtained therewith are not as satisfactory.

A preferred group are the polyethylene glycols having a molecular weight in the range of from about 150 up to about 600, and a particularly preferred class are those having a molecular weight in a range from about 200 to 600. Within these preferred ranges, it has been found that most effective results are obtained in terms of readiness to release the stuck pipe and also to effect release within the shortest period of time. Most effective results have been found when the polyethylene glycol is employed at a 100% concentration in the borehole to release the stuck pipe. However, within certain limits, hereinafter set forth, solutions of the polyethylene glycol in saturated salt water at concentrations of from about one part of polyethylene glycol to from 0.25 to 3 parts of saturated salt water or sea water can be used. However, it has been found that with the lower molecular weight polyethylene glycols such as diethylene glycol having a molecular weight of 106 and triethylene glycol having a molecular weight of about 150, concentration ranges of one part of the glycol to three parts of saturated salt water, (25% aqueous solutions of these glycols), or one part of the glycol to one part of sea water representing a 50% aqueous solution of the glycol, have been ineffective. In addition, it has been found that a concentration of one part of polyethylene glycol 600 in three parts of sea water, representing a 25% aqueous solution of the glycol, is ineffective. Consequently, these compositions in these ranges are outside the scope of the present invention.

The additives of the invention were evaluated in a laboratory apparatus to determine their effectiveness as a drilling pipe release agent.

The evaluation was carried out in the following apparatus.

A 7.0 cm. Watman 42 filter paper is placed in an vacuum funnel measuring 7.859 cm. in diameter. A flat metallic plate measuring 4.445 cm. in diameter and having a thickness of 1.588 mm. is pressed against the filter paper in the funnel. A vacuum is pulled on the suction side of the funnel until a reading of from 0.5 to 1.0 mm. of mercury is attained. A standard fluid mud composed of water, clay and a lignosulfonate dispersant is poured into the funnel until the funnel is filled with the mud. The vacuum is maintained for a period of thirty minutes during which time a mud cake forms around the metal disc. Thereafter excess mud is removed from the funnel using a syringe without disturbing the metal plate until only the cake remains in place around the metal plate.

The test fluid is then poured into the vacuum funnel and permitted to remain in contact with the upper surface of the mud cake and plate. A brass rod is attached to the metal plate and extends upwards from the funnel. The other end of the rod is attached to a flexible line that is passed through two pulleys mounted on a horizontal beam to effect a upward vertical force on the metal plate. A 1,000 gram weight is attached to the line to induce separation of the metal plate from the filter cake. At the same time as the 1,000 gram weight is attached to the flexible line a time clock is started. The time for the plate to separate from the filter cake is recorded. The test is terminated after a total time of 7,000 seconds has elapsed. The test is considered a failure if the plate is not freed within this time period.

The test procedure permits a qualitative evaluation of the efficiency of the additive.

weight of a polyethylene glycol having a molecular weight of from 300 to 600 with 50% by weight of sea water; and an admixture of 25% to 50% by weight of a polyethylene glycol having a molecular weight of 300 with from 75 to 50% by weight of sea water.

TABLE

| EXAMPLE | ADDITIVE AND M.W. | | ADDITIVE CONCENTRATION % | DILUENT | RELEASE TIME (SECONDS) | REMARKS |
|---------|-------------------|------|------|-----------|------|-----------|
| 1 | Ethylene Glycol | 62 | 100 | — | 7000 | No Release |
| 2 | Dithylene Glycol | 106 | 100 | — | 227 | Released |
| 3 | Triethylene Glycol | 150 | 100 | — | 139 | Released |
| 4 | Polyethylene Glycol | 200 | 100 | — | 180 | Released |
| 5 | Polyethylene Glycol | 300 | 100 | — | 188 | Released |
| 6 | Polyethylene Glycol | 600 | 100 | — | 800 | Released |
| 7 | Diethylene Glycol | 106 | 50 | Sea Water | 7000 | No Release |
| 8 | Triethylene Glycol | 150 | 50 | Sea Water | 7000 | No Release |
| 9 | Polyethylene Glycol | 300 | 50 | Sea Water | 830 | Released |
| 10 | Polyethylene Glycol | 600 | 50 | Sea Water | 197 | Released |
| 11 | Polyethylene Glycol | 300 | 25 | Sea Water | 1120 | Released |
| 12 | Polyethylene Glycol | 600 | 25 | Sea Water | 7000 | No Release |
| 13 | Diethylene Glycol | 106 | 50 | Salt Water | 256 | Released |
| 14 | Triethylene Glycol | 150 | 50 | Salt Water | 215 | Released |
| 15 | Polyethylene Glycol | 300 | 50 | Salt Water | 355 | Released |
| 16 | Polyethylene Glycol | 600 | 50 | Salt Water | 136 | Released |
| 17 | Diethylene Glycol | 106 | 25 | Salt Water | 7000 | No Release |
| 18 | Triethylene Glycol | 150 | 25 | Salt Water | 199 | Released |
| 19 | Polyethylene Glycol | 300 | 25 | Salt Water | 209 | Released |
| 20 | Polyethylene Glycol | 600 | 25 | Salt Water | 166 | Released |
| A | Diesel Oil | | 100 | — | 7200 | Released |
| B | Product X(1) | | 100 | — | 7300 | Released |
| C | Product X(1) | | 2.38* | Diesel Oil | 5400 | Released |
| D | Product Y(1) | | 2.38* | Diesel Oil | 4600 | Released |

(1)Commercial Products
*1 gal of additive in 1 bbl of Diesel Oil

The data in the above Table illustrate the operability of the present invention and demonstrate the unexpected advantages thereof over the commercial products X and Y as well as over diesel oil. In the case of Diesel Oil and Product X at 100% concentration, the time of the tests was continued beyond the 7000 second termination time of the other tests.

Examples 1, 7, 12 and 17 illustrate the criticality of the invention in terms of molecular weight, concentrations and diluents.

Obviously, many modifications and variations of the invention as hereinbefore set forth may be made without departing from the spirit and scope thereof and therefore only such limitations should be imposed as are indicated in the appended claims.

I claim:

1. An improved method of releasing a stuck drill string in the borehole of an underground formation during drilling operations employing an aqueous drilling fluid which comprises contacting said stuck drill string with an additive composition effective to reduce the annular pressure exerted by the drilling fluid against the stuck drill string and to release said stuck drill string, said additive composition being a member selected from the group consisting of 100% by weight polyethylene glycol having a molecular weight of from about 106 to 600; an admixture of from 25 to 50% by weight of a polyethylene glycol having a molecular weight of from 150 to 600 with from 75 to 50% by weight of saturated salt water; an admixture of 50% by weight of a polyethylene glycol having a molecular weight of from 300 to 600 with 50% by weight of sea water; and an admixture of 25% to 50% by weight of a polyethylene glycol having a molecular weight of 300 with from 75 to 50% by weight of sea water.

2. A method as claimed in claim 1 wherein said 100% by weight polyethylene glycol is diethylene glycol.

3. A method as claimed in claim 1 wherein said 100% by weight polyethylene glycol is triethylene glycol.

4. A method as claimed in claim 1 wherein said 100% by weight polyethylene glycol is polyethylene glycol 300.

5. A method as claimed in claim 1 wherein said 100% by weight polyethylene glycol is polyethylene glycol 600.

6. A method as claimed in claim 1 wherein said additive composition is sea water solution containing about 25%–50% by weight of said polyethylene glycol 300.

7. A method as claimed in claim 1 wherein said additive composition is sea water solution containing about 50% by weight of said polyethylene glycol 600.

8. A method as claimed in claim 1 wherein said additive composition is saturated salt water solution containing from 25% to 50% by weight of triethylene glycol.

9. A method as claimed in claim 1 wherein said additive composition is saturated salt water solution containing from 25% to 50% by weight of polyethylene glycol 300.

10. A method as claimed in claim 1 wherein said additive composition is saturated salt water solution containing from 25% to 50% by weight of polyethylene glycol 600.

* * * * *